W. E. LINCOLN.
Cream-Raising Can.
No. 222,828. Patented Dec. 23, 1879.
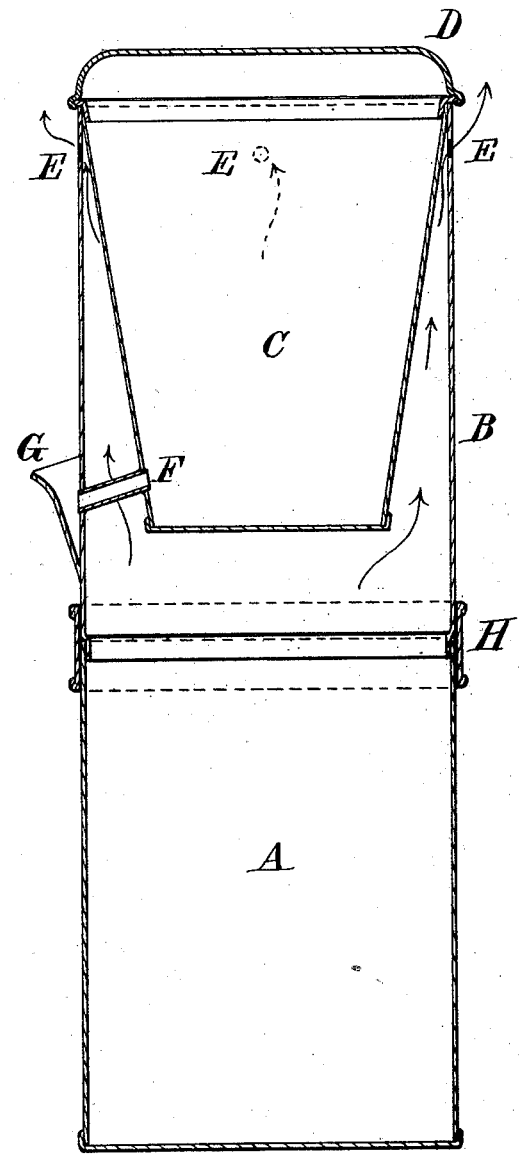
WITNESSES:
Edward K. Hill,
Edward F. Tolman.
INVENTOR:
Wm. E. Lincoln,
BY HIS ATTY., Jas. G. Arnold

UNITED STATES PATENT OFFICE.

WILLIAM E. LINCOLN, OF WARREN, MASSACHUSETTS.

IMPROVEMENT IN CREAM-RAISING CANS.

Specification forming part of Letters Patent No. 222,828, dated December 23, 1879; application filed June 26, 1879.

*To all whom it may concern:*

Be it known that I, WILLIAM E. LINCOLN, of Warren, in the county of Worcester, State of Massachusetts, have invented a new and useful Improvement in Cream-Raising Cans, of which the following is a specification.

It is well known in dairy-work that contamination of the cream deteriorates the butter, and that two prevalent sources thereof must be carefully guarded against—the one, the animal odors arising from the milk in cooling, the other the contact of impure air or vapors with the milk or cream.

The object of my invention is to raise the cream quickly under such conditions that the contact of impure air or vapor is prevented, while the odoriferous vapors arising from the milk are allowed to pass off, leaving the cream pure.

To do this, in connection with the usual cooling of the outside of the can of milk, I use a cooler, acting through an air-chamber over the milk, of such a nature that, while the external air is prevented from coming in contact with the milk or cream, the escape of the volatile gases of animal odors is facilitated, and the purity of the cream insured.

The accompanying drawing shows a section of a cream-raiser embodying my invention.

A is the milk-can, to the top of which is fitted the cooling-can B, with a flange fitting into the top of A, or an outside sliding band, H, made to fit over the joint, or by the use of both flange and band, as shown, the can B having an inner compartment, C, for holding ice or cooling-mixtures, having a cover, D, and connected to B at its top, and made smaller at the bottom, as shown, so that an air-space is left around C in the can B, whose only connection with the external air is through the small holes E E E, which are made in the upper part of the can B.

At F is a vent to allow the escape of water from the chamber C, and a trap, G, to prevent access of air.

In operation, the milk is put into the can A, which I prefer to set in cool water, in the usual manner, and the can B is put on with the chamber C filled with ice, cold water, or other cooling-matter, and thus left for the cream to rise, the cooling effect of the cold chamber C acting through the air on the milk from which the animal odors rise and pass off through the openings E E E, as indicated by the arrows.

This apparatus works most satisfactorily—that is to say, cream is most rapidly raised—by having the temperatures of the two vessels A and C nearly equalized. Such temperatures may not be exactly the same, but may vary as circumstances—such as the size of the vessels, &c.—seem to require. A little practice will soon determine the relative proportions of cold necessary.

Having thus fully described my invention, what I claim therein as new, and desire to secure by Letters Patent, is—

1. The milk-can A and reservoir B, capable of being separated, and the latter provided with openings E E, cooling-receptacle C, and cover D, all constructed substantially as and for the purposes described.

2. The milk-can A, separable reservoir B, having openings E E, cooling-receptacle C, cover D, pipe F, and trap G, all constructed and operating substantially as and for the purposes described.

WM. E. LINCOLN.

Witnesses:
KELO. WANCE,
J. G. ARNOLD.